United States Patent
Melzer et al.

(10) Patent No.: US 9,678,345 B1
(45) Date of Patent: Jun. 13, 2017

(54) DYNAMIC VERGENCE CORRECTION IN BINOCULAR DISPLAYS

(71) Applicants: James E. Melzer, Encinitas, CA (US); Wyatt L. Hendrick, Encinitas, CA (US); Augusto H. Alvarez, San Marcos, CA (US); Juan C. Salazar, Vista, CA (US); David M. Leath, Carlsbad, CA (US); Wei L. Wang, Poway, CA (US)

(72) Inventors: James E. Melzer, Encinitas, CA (US); Wyatt L. Hendrick, Encinitas, CA (US); Augusto H. Alvarez, San Marcos, CA (US); Juan C. Salazar, Vista, CA (US); David M. Leath, Carlsbad, CA (US); Wei L. Wang, Poway, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 99 days.

(21) Appl. No.: 14/460,813

(22) Filed: Aug. 15, 2014

(51) Int. Cl.
G02B 27/01 (2006.01)

(52) U.S. Cl.
CPC .. *G02B 27/0172* (2013.01); *G02B 2027/0132* (2013.01)

(58) Field of Classification Search
CPC ........ G02B 27/0172; G02B 2027/0127; G02B 2027/014; G02B 2027/0187
USPC ........................................................... 345/8
See application file for complete search history.

(56) References Cited

U.S. PATENT DOCUMENTS

| | | | |
|---|---|---|---|
| 9,170,425 B1* | 10/2015 | Harrison | G02B 17/06 |
| 2006/0250322 A1* | 11/2006 | Hall | G02B 27/0172 345/8 |
| 2013/0195204 A1* | 8/2013 | Reznik | H04N 19/85 375/240.26 |

OTHER PUBLICATIONS

Browne et al., "Improving the Utility of Binocular HMD in a Faceted Flight Simulator," Interservice/Industry Training Simulation and Education Conference (2009), Paper No. 9178, 12 pages.*
Bahill et al., "Most naturally occurring human saccades have magnitudes of 15 degrees or less." Investigative Ophthalmology & Visual Science 14.6 (1975): pp. 468-469.

(Continued)

*Primary Examiner* — Amare Mengistu
*Assistant Examiner* — Jennifer Zubajlo
(74) *Attorney, Agent, or Firm* — Donna P. Suchy; Daniel M. Barbieri

(57) ABSTRACT

A binocular display vergence correction system is described. The binocular display vergence correction system includes a binocular display, a display tracking system, and a controller. The binocular display, being pixelated, includes a left eye image display and a right eye image display. The display tracking system is configured to determine the position and angular orientation of the binocular display relative to an origin position and origin angular orientation. The controller, includes a processor, and is configured to correct the vergence of the binocular display based on an apparent viewing distance from an eye position of the binocular display to a target object to be viewed on a screen based on the determined position and angular orientation of the binocular display. A method of correcting vergence for a pixelated binocular display is also described.

18 Claims, 4 Drawing Sheets

(56) References Cited

OTHER PUBLICATIONS

Banks et al., "Insight into vergence/accommodation mismatch." SPIE Defense, Security, and Sensing. International Society for Optics and Photonics, (2013), 18 pages.
Hoffman et al., "Vergence-accommodation conflicts hinder visual performance and cause visual fatigue", Journal of Vision, (2008) pp. 1-30, vol. 8.
Self, H.C., "Optical tolerances for alignment and image differences for binocular helmet-mounted displays", Air Force Systems Command report AAMRL-TR-86-019, (1986) Wright-Patterson Air Force Base, Ohio, 37 pages.

* cited by examiner

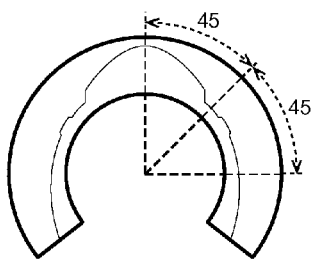
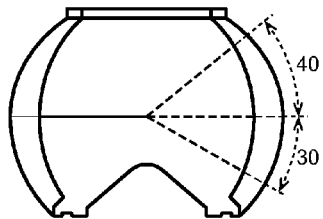
FIG. 3A            FIG. 3B
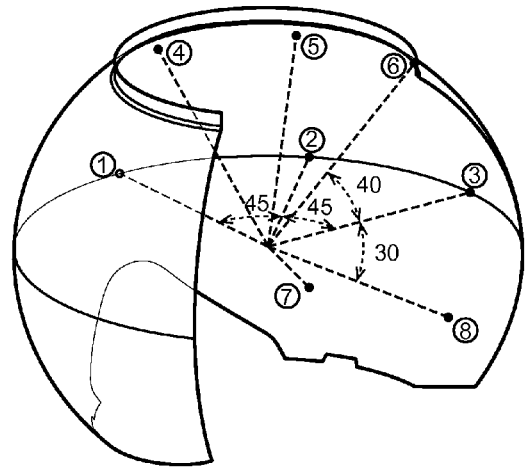
FIG. 3C
| Target | X | Y | Z | Dist. |
|---|---|---|---|---|
| 1 (0,0) | 0.0 | 0.0 | -66.8 | 66.8 |
| 2 (45,0) | 47.2 | 0.0 | -47.2 | 66.8 |
| 3 (90,0) | 66.8 | 0.0 | 0.0 | 66.8 |
| 4 (0,40) | 0.0 | 41.2 | -49.1 | 64.1 |
| 5 (45,40) | 34.6 | 41.0 | -34.6 | 63.8 |
| 6 (90,40) | 48.9 | 41.0 | 0.0 | 63.8 |
| 7 (45,-30) | 40.9 | -33.4 | -40.9 | 66.8 |
| 8 (90,30) | 57.8 | -33.4 | 0.0 | 66.8 |
| Target | Dist. | error (inches) | error (mrad) | error (pixels) |
|---|---|---|---|---|
| 1 (0,0) | 66.8 | 0.0 | 0.0 | 0.0 |
| 2 (45,0) | 66.8 | 0.0 | 0.0 | 0.0 |
| 3 (90,0) | 66.8 | 0.0 | 0.0 | 0.0 |
| 4 (0,40) | 64.1 | -2.7 | -0.8 | -1.5 |
| 5 (45,40) | 63.8 | -3.0 | -0.9 | -1.6 |
| 6 (90,40) | 63.8 | -3.0 | -0.9 | -1.6 |
| 7 (45,-30) | 66.8 | 0.0 | 0.0 | 0.0 |
| 8 (90,30) | 66.8 | 0.0 | 0.0 | 0.0 |
FIG. 4A            FIG. 4B

| Target | Design Eye | Back, center line | Back, upper left | Back, lower left | Back, lower right | Back, upper right | Forward, center line | Forward, upper left | Forward, lower left | Forward, lower right | Forward, upper right |
|---|---|---|---|---|---|---|---|---|---|---|---|
| | (0,0,0) | (0,0,7) | (0,0,7) | (0,0,7) | (0,0,7) | (0,0,7) | (0,0,7) | (0,0,7) | (0,0,7) | (0,0,7) | (0,0,7) |
| 1 (0,0) | 0.0 | 1.8 | 2.0 | 2.0 | 2.0 | 2.0 | -2.2 | -1.9 | -1.9 | -1.9 | -1.9 |
| 2 (45,0) | 0.0 | 1.4 | 2.8 | 2.8 | -0.1 | 0.0 | -1.5 | 0.7 | 0.7 | -3.8 | -3.7 |
| 3 (90,0) | 0.0 | 0.1 | 2.4 | 2.4 | -2.7 | -2.7 | 0.1 | 2.4 | 2.4 | -2.7 | -2.7 |
| 4 (0,40) | -0.8 | 0.8 | -0.1 | 1.7 | 1.7 | -0.1 | -2.6 | -4.1 | -1.1 | -1.1 | -4.1 |
| 5 (45,40) | -0.9 | 0.3 | 0.7 | 2.3 | 0.1 | -2.4 | -2.1 | -1.6 | 0.6 | -2.4 | -6.1 |
| 6 (90,40) | -0.9 | -0.8 | 0.2 | 1.9 | -1.7 | -5.0 | -0.8 | 0.2 | 1.9 | -1.7 | -5.0 |
| 7 (45,-30) | 0.0 | 1.2 | 3.2 | 2.0 | -0.8 | 1.0 | -1.2 | 1.5 | 0.0 | -4.3 | -1.6 |
| 8 (90,30) | 0.0 | 0.1 | 2.8 | 1.6 | -3.3 | -0.9 | 0.1 | 2.8 | 1.6 | -3.3 | -0.9 |

DYNAMIC VERGENCE CORRECTION IN BINOCULAR DISPLAYS

BACKGROUND

The present invention relates generally to a system and method for dynamic vergence correction in binocular displays.

Binocular displays, such as binocular helmet mounted displays (HMDs), are known to be used in aircraft applications, both in in-flight applications, and in flight simulators. For a binocular display, the left eye sees a left eye image display, while the right eye sees a right eye image display. In in-flight applications, a pilot wearing a binocular HMD generally has freedom to move his head so as to look anywhere through an aircraft canopy and windscreen, where the pilot may view a target object on the aircraft canopy or windscreen at an apparent viewing distance via the binocular HMD. Similarly, a pilot wearing a binocular HMD in a flight simulator has the freedom to move his head within a "head motion box" and at a desired orientation to view a target object on a simulator screen of the simulator.

Binocular displays, such as binocular HMDs, are typically designed with a single fixed vergence distance, meaning the imagery appears to come from a certain distance, and does not change, unlike what happens in an environment without a binocular display, where one may change eye focus and vergence to maintain single vision perception of objects. Objects closer or farther away will be perceived as double, which is referred to as diplopia.

Browne et al. (Browne et al, "Improving the Utility of Binocular HMD in a Faceted Flight Simulator," Interservice/Industry Training Simulation and Education Conference 2009, Paper No. 9178) disclose correcting vergence error. The approach disclosed in Browne et al., however, is limited to correcting vergence errors in faceted, flat faced, simulators.

SUMMARY

According to one embodiment there is provided a binocular display vergence correction system. The system comprises: a binocular display, being pixelated, comprising a left eye image display and a right eye image display; a display tracking system configured to determine the position and angular orientation of the binocular display relative to an origin position and origin angular orientation; and a controller, including a processor, configured to correct the vergence of the binocular display based on an apparent viewing distance from an eye position of the binocular display to a target object to be viewed on a screen based on the determined position and angular orientation of the binocular display.

According to one aspect of the embodiment, the determined position and angular orientation of the binocular display has six degrees of freedom.

According to another aspect of the embodiment, the screen has a curved surface.

According to another aspect of the embodiment, the screen is an aircraft transparency screen having an optical power greater than zero.

According to another aspect of the embodiment, the screen is a simulator screen of a flight simulator, where the distance from the origin to the simulator screen varies with the angular orientation of the binocular display.

According to another aspect of the embodiment, the controller is configured to correct the vergence based on a look up table relating the determined position and angular orientation of the binocular display with a vergence correction value.

According to another aspect of the embodiment, the controller is configured to correct the vergence of the binocular display based on the optical power of the screen.

According to another aspect of the embodiment, the binocular display is a helmet mounted display.

According to another aspect of the embodiment, the controller is configured to correct the vergence of the binocular display only if an error in the vergence is determined to be greater than a vergence error threshold.

According to another aspect of the embodiment, the vergence error threshold is about 2 mrad.

According to another embodiment, there is provided a method of correcting vergence for a pixelated binocular display comprising a left eye image display and a right eye image display. The method includes: determining the position and angular orientation of the binocular display relative to an origin position and origin angular orientation; and correcting the vergence of the binocular display based on an apparent viewing distance from an eye position of the binocular display to a target object to be viewed on a screen based on the determined position and angular orientation of the binocular display.

According to one aspect of the embodiment, the determined position and angular orientation of the binocular display has six degrees of freedom.

According to another aspect of the embodiment, the screen has a curved surface.

According to another aspect of the embodiment, the screen is an aircraft transparency screen having an optical power greater than zero.

According to another aspect of the embodiment, the screen is a simulator screen of a flight simulator, where the distance from the origin to the simulator screen varies with the angular orientation of the binocular display.

According to another aspect of the embodiment, the vergence is corrected based on a look up table relating the determined position and angular orientation of the binocular display with a vergence correction value.

According to another aspect of the embodiment, the vergence is corrected based on the optical power of the screen.

According to another aspect of the embodiment, the binocular display is a helmet mounted display.

According to another aspect of the embodiment, the vergence of the binocular display is corrected only if an error in the vergence is determined to be greater than a vergence error threshold.

According to another embodiment, there is provided a binocular display vergence correction system. The system comprises: a binocular display, being pixelated, comprising a left eye image display and a right eye image display; a display tracking system configured to determine the position and angular orientation of the binocular display relative to an origin position and origin angular orientation; and a controller, including a processor, configured to perform dynamic image warping over an entire field of view of the binocular display and to correct the vergence of the binocular display based on the dynamic image warping.

BRIEF DESCRIPTION OF THE DRAWINGS

FIG. 3A is a top view of a simulator dome with a simulator screen.

FIG. 3B is a side view of the simulator dome with simulator screen of FIG. 3A.

FIG. 3C is a perspective view of the simulator dome with simulator screen of FIG. 3A.

FIG. 4A is a table illustrating the distance to the simulator screen for eight different target locations.

FIG. 4B is a table illustrating the distance to the simulator screen and offset errors for eight different target locations.

DETAILED DESCRIPTION

The approach taken by the present inventors in correcting for vergence is applicable to applications where the target objects to be seen are on curved surfaces, such as, for example, curved canopies in real aircraft, and for domed flight simulators. Moreover the present approach may beneficially use all six degrees of freedom (3 rotational degrees of freedom and 3 positional degrees of freedom) from a head tracker to dynamically correct vergence in real time, based on the calculation of distance to the particular location on the screen.

While binocular displays with a fixed vergence are acceptable for many applications, in some applications a fixed vergence is not acceptable and may induce eye strain. Applications where a fixed vergence may not be acceptable include (1) in-flight applications where the aircraft has a curved canopy or windscreen, and (2) flight simulators with close viewing distances, which are referred to as short conjugate simulators.

In both applications (1) and (2), the apparent viewing distance to an object on a screen varies depending on the direction the pilot is looking, where the apparent viewing distance can change. In this case, as is discussed in more detail later, a binocular HMD with a fixed vergence may cause eye strain depending on the direction and position of the binocular HMD worn by the pilot.

For in-flight applications, curved aircraft canopies and windscreens (hereafter referred to as a transparency screen) have an optical power similar to that of a weak lens. When a viewer views through the transparency screen, objects normally at far distance appear much closer. A HMD allows the pilot to look anywhere through the transparency screen. The pilot's freedom to move their head, however, exacerbates the optical correction problem due to the curved transparency screen, because the optical power of the transparency screen, and therefore the apparent viewing distance, varies depending on the direction the pilot is looking, which can change.

For flight simulator applications, the pilot/trainee, wearing a binocular HMD, sits in a small domed simulator, typically about 67 inches from the curved surface of a simulator screen of the dome when the pilot has his head oriented in a forward direction, and in a "design eye" position in a central location of the simulator for a typical simulator. If the pilot maintains his head in the design eye position, the viewing range to the simulator screen varies from about 63 inches to about 68 inches depending on the angular orientation of the pilot's head.

Figure 1:
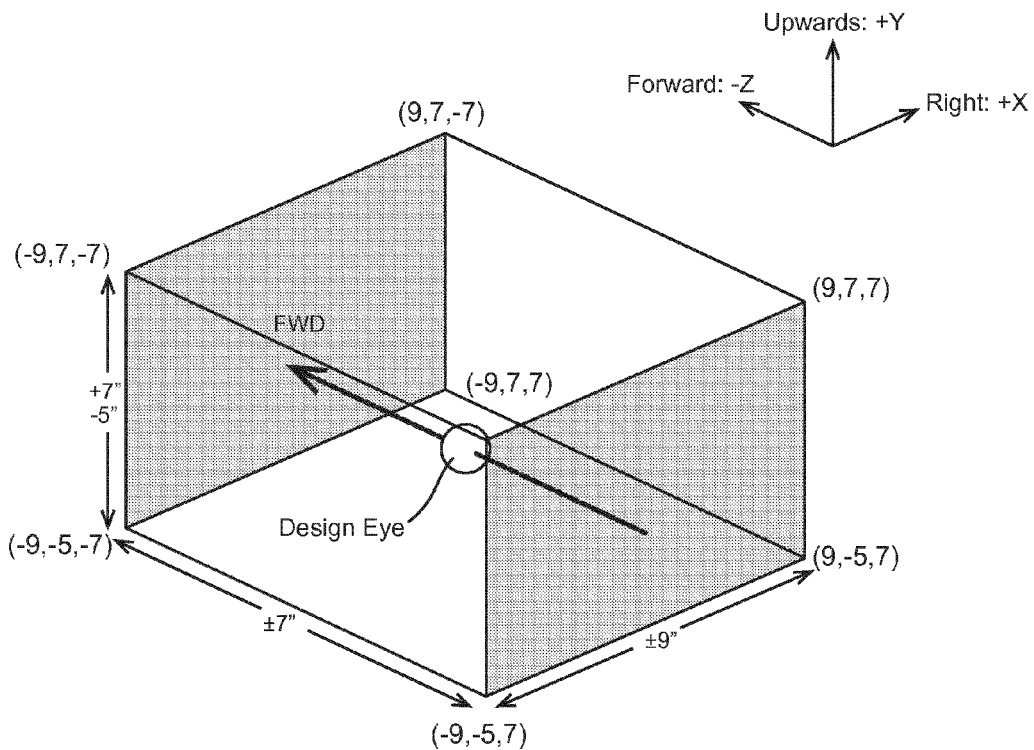
FIG. 1 is an illustration of a typical motion head box relative to the design eye as might be found in an aircraft or simulator.

The viewing range is even larger, because the pilot is allowed to positionally move his head with a "head motion box." FIG. 1 illustrates a typical head motion box for a flight simulator showing the range of position that is allowed for the pilot's head. The design eye is shown in a central location of the box. The head motion box in FIG. 1 allows head movement relative to the central design eye position ±7 inches in the forward direction, ±9 inches in the left-right direction, and from +7 inches to −5 inches in the up-down direction. FIG. 1 illustrates a typical head motion box, and in practice the dimensions of the head motion box may be different from that shown in FIG. 1. With the head motion positional range as shown in FIG. 1, the viewing distance range runs from about 50 inches to more than about 80 inches. Therefore, in a similar fashion to the in-flight application with a curved transparency screen, the apparent viewing distance varies depending on the direction the pilot is looking, where the apparent viewing distance can change.

As mentioned above, a binocular HMD with a fixed vergence may cause eye strain depending on the direction and position of the binocular HMD worn by the pilot in the case where the apparent viewing distance to an object on a curved screen varies depending on the direction the pilot is looking. The human binocular vision system has evolved to view objects at distances with a linked system of accommodation (the lens of the eye changes shape to focus on an object at a fixation distance) and vergence (the two eyes together change their orientation angle simultaneously to maintain single vision on an object at the fixation distance). When attempting to view an object at a different distance, both vergence and focus are changed to best see the object.

Figure 2:
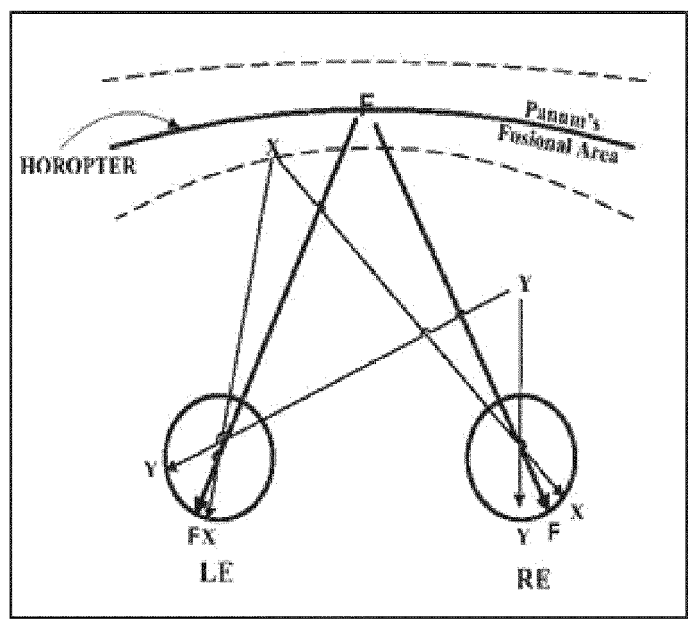
FIG. 2 is an illustration of the horopter and Panum's fusional area.

FIG. 2 illustrates the horopter relative to a left eye (LE) and right eye (RE). The horopter is defined as an arc around the eyes along which objects will be seen as single images for a given fixation distance. On either side of the horopter is a range of distance within which the vergence or focus need not be changed to see objects. Larger distances from the horopter can cause a breakdown in binocular fusion, i.e., an object at the horopter will be seen as a single image, but another object at a distance from the horopter will be seen as a double image. The range of distance within which the vergence or focus need not be changed to see objects is Panum's Fusional Area, which subtends approximately 15 to 30 arcminutes for convergence angle. The Zone of Comfortable Binocular Vision subtends approximately ⅓rd of Panum's Fusional Area on either side of the horopter. (See Hoffman, D. M., Girshick, A. R., Akley., K., Banks, M. S. (2008). Vergence-accommodation conflicts hinder visual performance and cause visual fatigue, Journal of Vision, vol. 8, pages 1-30, and Banks, Martin S., Joohwan Kim, and Takashi Shibata. "Insight into vergence/accommodation mismatch." SPIE Defense, Security, and Sensing. International Society for Optics and Photonics, 2013.). It is in this area that two images can be fused (both images are seen as a single image) for extended viewing periods without visual discomfort. Thus the range of comfortable horizontal fusion is approximately 5 to 10 arcminutes (1.5 to 2.9 milliradians). If a pilot or pilot trainee tries to fuse the imagery that is out of range, it can cause diplopia which may result in eye strain and fatigue. If that happens, the natural tendency is to not look in those directions, resulting in possibly missing an important object (in-flight) or negative training (flight simulator).

Correcting for Varying Vergence

In general the appropriate vergence for a target object to be viewed on screen will be depend on the apparent viewing distance from an eye position of a binocular display to a target object to be viewed on a screen. The apparent viewing distance in turn depends on the position and angular orientation of the binocular display. In the case of applications with a curved transparency screen, the apparent viewing position will also depend on the optical power of the transparency screen at the position of the transparency screen where the target object is being viewed.

FIGS. 3A-3C illustrate views of a portion of a simulator dome 10 with a simulator screen 20 used for calculating the vergence as a function of position and angular orientation of a binocular display for a flight simulator application. FIGS. 3A-3C are a top view, side view and perspective view, respectively, of the simulator dome 10.

For ease of illustration of determining the vergence as a function of angular orientation, eight viewing locations, 1-8, are illustrated in FIGS. 3A-3C. All viewing locations originate at the design eye, which is at the origin position. The eight target locations are shown in the table of FIG. 4A. The viewing locations, 1-8, for the target area shown in FIG. 4A are expressed in terms of the azimuthal angle and elevation angle as (azimuthal angle, elevation angle) relative to the forward direction (azimuthal angle=0, elevation angle=0). The cartesian coordinates, in inches, for the target are also shown in the table of FIG. 4A, where the −Z direction is the forward direction, the +Y direction is the upward direction, and +X direction is the direction to the right. The distance, in inches, to the simulator screen is also shown in the table of FIG. 4A. Presuming a binocular display with a fixed vergence of 63 inches, the range of distances to the simulator screen shown in FIG. 4A is not extreme.

FIG. 4B is a table illustrating the distance, in inches, to the simulator screen for the eight different angular orientations illustrated in FIGS. 3A-3C, along with the offset error in inches and mrad. These errors are then converted to the required number of pixels that need to be moved in a typical HMD. The offset error is the difference between the value at the fixed vergence of 63 inches, and the value at the appropriate vergence for the angular orientation.

Figures 5, 6:
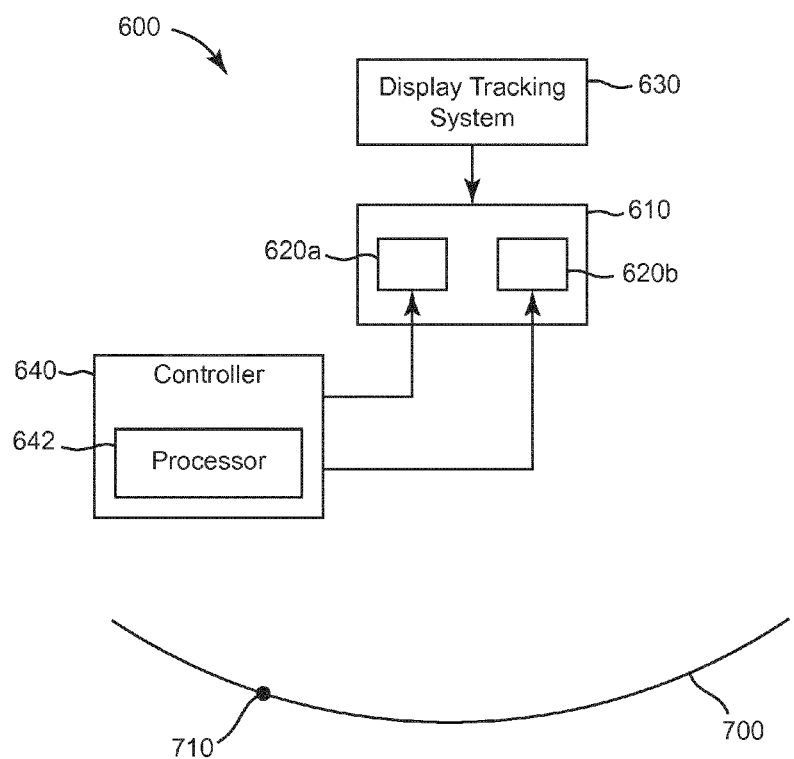
FIG. 5 is a table illustrating the vergence error for the eight different angular orientations of FIG. 4A, at the position of the eight different corners of the head box and the back and center line positions.
FIG. 6 is a schematic of a binocular vergence correction system according to an embodiment of the invention.

Allowing the pilot to move his head within the entire range of a head box (see FIG. 1), however, introduces significant vergence errors as illustrated in the table of FIG. 5, where the vergence errors, expressed in mrad, are shown for the eight different angular orientations of FIG. 4A, which are the target locations shown in FIG. 3C. The vergence error is the difference between a fixed vergence for the display, and the appropriate vergence for the position and angular orientation of the binocular display. A vergence error of ≥2 mrad is significant enough to cause viewing problems. FIG. 5 illustrates the vergence error in mrad for the eight different angular orientations of FIG. 4A, at the position of the eight different corners of the head box and the back and center line positions. In this table, a negative value means that the viewing distance to the screen is closer than the fixed HMD vergence distance and a positive value means that the viewing distance to the screen is farther out from the fixed HMD vergence distance. Note the number of distances where the error is ≥2 mrad (positive or negative) from the nominal setting, with the largest values (+3.2 mrad and −6.1 mrad respectively) are shown as grayed values.

For a curved screen with an optical power, the apparent viewing distance from an eye position of the binocular display to a target object to be viewed on a screen will also depend on the optical power of the screen at the point of the target object. For example, in applications with a curved transparency screen, the effect of the optical power on the apparent viewing distance, and thus the vergence correction, must be taken into account.

FIG. 6 is a schematic of a binocular vergence correction system 600 according to an embodiment of the invention.

The system 600 includes a binocular display 610 with a left eye image display 620a and a right eye image display 620b. The system further includes a display tracking system 630, and a controller 640, which includes a processor 642.

The binocular display 610 is pixelated, where each of the left eye image display 620a and the right eye image display 620b are pixelated displays. The pixelated displays may be a LCD (liquid crystal display), LCOS (liquid crystal on silicon), AMLCD (active matrix liquid crystal display), or OLED (organic light emitting diode) display, for example.

The display tracking system 630 is configured to determine the position and angular orientation of the binocular display 610 relative to an origin position and origin orientation. For example, in the case of a simulator application, the origin position may be the design eye of the simulator. The origin angular orientation may be the angular orientation for the forward direction with a roll angle of zero, for example. If the binocular display is a HMD binocular display mounted on a helmet, the display tracking system 630 may be configured to determine the position and angular orientation of the helmet, and determine the position and angular orientation of the binocular display based on the known position of the HMD binocular display relative to the helmet, for example. The position and angular orientation may have six degrees of freedom, for example, three positional degrees of freedom in cartesian x, y, z coordinates, and three rotations degrees of freedom with elevation, azimuthal and roll angles.

The display tracking system 630 may be an optical system, for example, such as one employing infrared emitters on the helmet and infrared detectors separate from the helmet, or vice versa, to measure the user's head position. Alternatively, the display tracking system 630 may be an electromagnetic sensing system, such as for example, including coils in the helmet which is disposed in an alternating field to produce alternating electrical voltages based on the movement of the helmet in multiple axes.

The controller 640 is configured to correct the vergence of the binocular display 610 based on an apparent viewing distance from an eye position of the binocular display 610 to a target object 710 to be viewed on a screen 700 based on the determined position and angular orientation of the binocular display 610 and the curvature of the screen 700 at the target object. In particular, the controller 640 corrects the vergence of the left eye image display 620a and the right eye image display 620b. The controller 640 may correct the vergence of the displays 620a and 620b by appropriately shifting the pixels on the display depending on the determined corrected vergence. The image, for example, may be adjusted by column shifting the pixels for the right eye image display 620b to the right and the pixels for the left eye image display 620a to the left, or vice versa, depending on the direction of the vergence correction.

The controller 640 may be configured to correct the vergence based on a look up table relating the determined position and angular orientation, along with the transparency screen curvature, of the binocular display with a vergence correction value. For example, a look up table similar to the table of FIG. 5 may be used to correct the vergence, where interpolation techniques may be employed to determine a vergence correction value for determined position and angular orientation not listed in the look up table. The values in the look up table may be determined prior to the operation of the system 600. Alternatively, the controller 640 may be configured to correct the vergence based on a vergence correction value determined on the fly. Determining the corrected vergence based on a look up table may increase the processing speed.

The controller 640 may be configured to correct the vergence of the binocular display only if an error in the vergence is determined to be greater than a vergence error threshold. The vergence error threshold may be about 2 mrad, for example. The value of 2 mrad corresponds to the vergence zone angular range of either side of the visual horopter, where the human visual system is capable of fusing binocular imagery. By correcting the vergence only for a vergence error greater than a vergence error threshold, the system may avoid corrections which are unnecessary for fusing binocular imagery, where such corrections could potentially slow the processing speed of the system.

Figure 7:
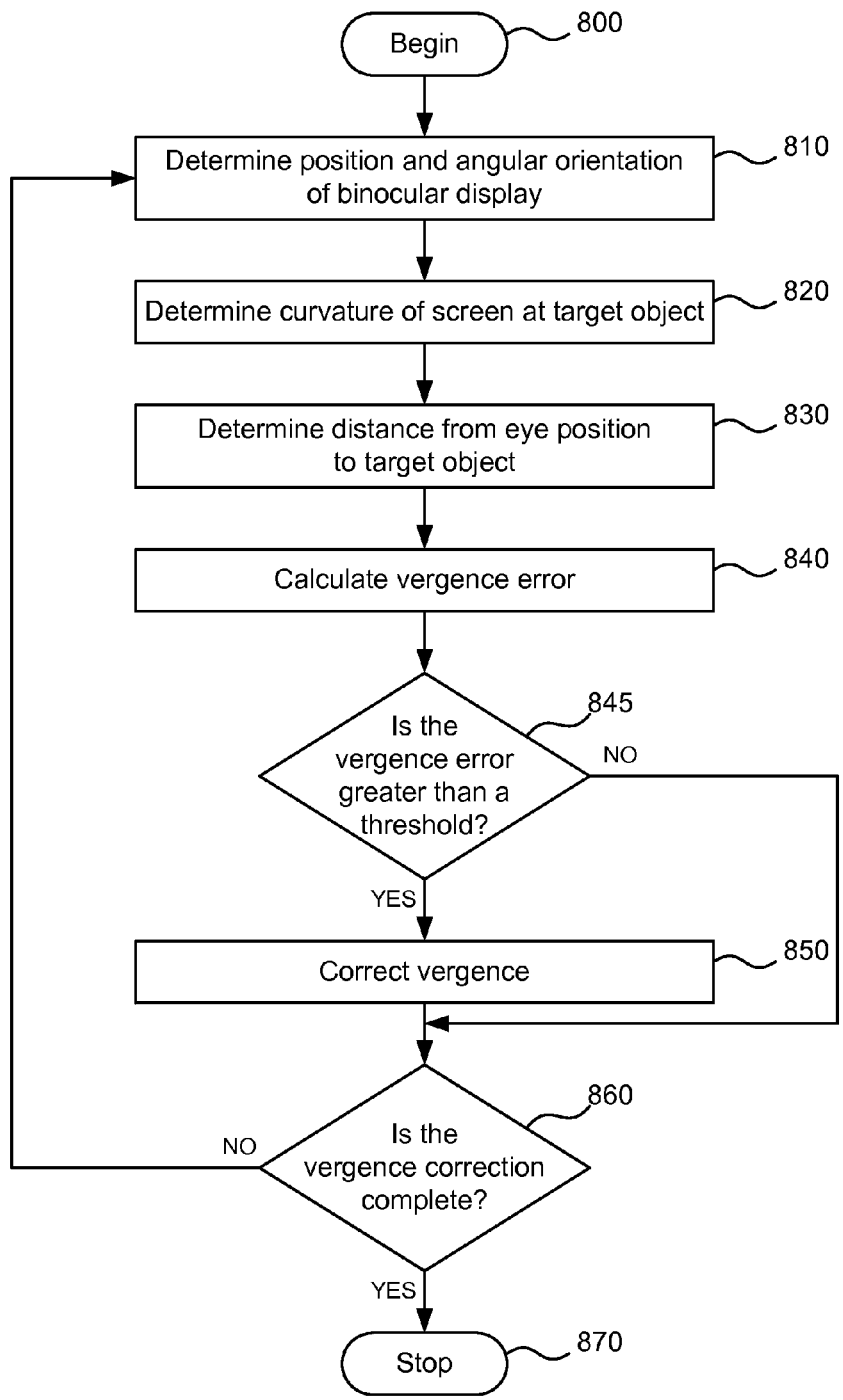
FIG. 7 is a flow chart illustrating a method of correcting vergence for a pixelated binocular display using the system of FIG. 6.

FIG. 7 is a flow chart illustrating a method of correcting vergence for a pixelated binocular display using the system of FIG. 6. In step 800 the correction process begins.

In step 810 the position and angular orientation of the binocular display 610 is determined relative to an origin position and origin orientation by display tracking system 630. For example, in the case of a simulator application, the origin position may be the design eye of the simulator. The origin angular orientation may be the angular orientation for the forward direction with a roll angle of zero, for example. If the binocular display is a HMD binocular display mounted on a helmet, the position and angular orientation of the helmet may be determined, and the position and angular orientation of the binocular display may be determined based on the known position of the HMD binocular display relative to the helmet, for example. The position and angular orientation may have six degrees of freedom, for example, three positional degrees of freedom in cartesian x, y, z coordinates, and three rotations degrees of freedom with elevation, azimuthal and roll angles.

In step 820, the curvature of the screen 700 at the position of the target object is determined. The curvature of the screen 700 be determined using a look up table which corresponds the positions on the screen 700 with a curvature at those positions. Interpolation may be used in the case that the position of the target object 610 on the screen 700 does not exactly correspond to a position in the look up table.

In step 830, the apparent viewing distance from an eye position of the binocular display 610 to a target object 710 to be viewed on a screen is determined. The apparent viewing distance may be determined based on the determined position and angular orientation of the binocular display 610.

In step 840, the vergence error is calculated based on an apparent viewing distance, and the curvature of the screen 700 at the target object 710. The vergence error may be determined based on a look up table, where the look up table may be determined prior to the operation, or may be determined on the fly.

In step 845, the vergence error may optionally be compared with a vergence error threshold. If the vergence error is greater than the vergence error threshold, the process proceeds to step 850, otherwise the process proceeds to step 860.

In step 850, the vergence of the display 620 is corrected. Specifically, the vergence of the left eye image display 620*a* and the right eye image display 620*b* is corrected based on the calculated vergence error. The controller 640 may correct the vergence of the displays 620*a* and 620*b* by appropriately shifting the pixels on the display depending on the determined corrected vergence. The image, for example, may be adjusted by column shifting the pixels for the right eye image display 620*b* to the right and the pixels for the left eye image display 620*a* to the left, or vice versa, depending on the direction of the vergence correction.

In step 860, it is determined if the vergence correction is done. If vergence correction is done, the process stops, otherwise the process proceeds to step 810.

In the above disclosed embodiments, the controller 640 may be configured to calculate and correct for a single vergence error at a point (single point vergence correction). Alternatively, the controller 640 may be configured to perform dynamic image warping to correct the vergence across the entire field of view of the binocular display 610. Dynamic image warping may be helpful in the case where the vergence changes significantly over a small angular change, such as when the screen is steeply curved. In dynamic image warping, rather than applying a single vergence correction of the image on the display, a varied vergence correction is applied over the entire field of view.

The above described binocular vergence correction system allows for correction of vergence in real time. Thus, the system allows for the reduction of user eye strain in real time.

The above described binocular vergence correction system allows for correction for vergence in applications where the target objects to be seen are on curved transparency surfaces. Such correction may beneficially use all six degrees of freedom (3 rotational degrees of freedom and 3 positional degrees of freedom) from a head tracker to dynamically correct vergence in real time. Furthermore, if dynamic image warping is performed, the entire field of view may be corrected.

The embodiments of the invention have been described in detail with particular reference to preferred embodiments thereof, but it will be understood by those skilled in the art that variations and modifications can be effected within the spirit and scope of the invention.

What is claimed is:

1. A binocular display vergence correction system, comprising:
   a binocular display, being pixelated, comprising a left eye image display and a right eye image display;
   a display tracking system configured to determine the position and angular orientation of the binocular display relative to an origin position and origin angular orientation; and
   a controller, including a processor, configured to correct the vergence of the binocular display based on an apparent viewing distance from an eye position of the binocular display to a target object to be viewed through a transparency screen based on the determined position and angular orientation of the binocular display and based on an optical power of the screen.

2. The binocular display vergence correction system of claim 1, wherein the determined position and angular orientation of the binocular display has six degrees of freedom.

3. The binocular display vergence correction system of claim 1, wherein the screen has a curved surface.

4. The binocular display vergence correction system of claim 1, wherein the screen is an aircraft transparency screen having an optical power greater than zero.

5. The binocular display vergence correction system of claim 1, wherein the screen is a simulator screen of a flight simulator, where the distance from the origin to the simulator screen varies with the angular orientation of the binocular display.

6. The binocular display vergence correction system of claim 1, wherein the controller is configured to correct the vergence based on a look up table relating the determined position and angular orientation of the binocular display with a vergence correction value.

7. The binocular display vergence correction system of claim 1, wherein the binocular display is a helmet mounted display.

8. The binocular display vergence correction system of claim 7, wherein the vergence error threshold is about 2 mrad.

9. The binocular display vergence correction system of claim 1, wherein the controller is configured to correct the vergence of the binocular display only if an error in the vergence is determined to be greater than a vergence error threshold.

10. A method of correcting vergence for a pixelated binocular display comprising a left eye image display and a right eye image display, the method comprising:
   determining the position and angular orientation of the binocular display relative to an origin position and origin angular orientation; and
   correcting the vergence of the binocular display based on an apparent viewing distance from an eye position of the binocular display to a target object to be viewed through a transparency screen based on the determined position and angular orientation of the binocular display and based on an optical power of the screen.

11. The method of claim 10, wherein the determined position and angular orientation of the binocular display has six degrees of freedom.

12. The method of claim 10, wherein the screen has a curved surface.

13. The method of claim 10, wherein the screen is an aircraft transparency screen having an optical power greater than zero.

14. The method of claim 10, wherein the screen is a simulator screen of a flight simulator, where the distance from the origin to the simulator screen varies with the angular orientation of the binocular display.

15. The method of claim 10, wherein the vergence is corrected based on a look up table relating the determined position and angular orientation of the binocular display with a vergence correction value.

16. The method of claim 10, wherein the binocular display is a helmet mounted display.

17. The method of claim 10, wherein the vergence of the binocular display is corrected only if an error in the vergence is determined to be greater than a vergence error threshold.

18. A binocular display vergence correction system, comprising:
   a binocular display, being pixelated, comprising a left eye image display and a right eye image display;
   a display tracking system configured to determine the position and angular orientation of the binocular display relative to an origin position and origin angular orientation; and
   a controller, including a processor, configured to perform dynamic image warping over an entire field of view of the binocular display and to apply a vergence correction that varies over the entire field of view of the binocular display based on the dynamic image warping.

* * * * *